(12) United States Patent
Xu

(10) Patent No.: US 12,188,959 B2
(45) Date of Patent: Jan. 7, 2025

(54) SPEED AND ACCELERATION CALCULATION AND MEASUREMENT METHOD, DEVICE, AND APPLICATION BASED ON REGULARIZATION ALGORITHMS

(71) Applicant: Peiliang Xu, Kyoto (JP)

(72) Inventor: Peiliang Xu, Kyoto (JP)

(*) Notice: Subject to any disclaimer, the term of this patent is extended or adjusted under 35 U.S.C. 154(b) by 90 days.

(21) Appl. No.: 17/574,173

(22) Filed: Jan. 12, 2022

(65) Prior Publication Data

US 2022/0221485 A1 Jul. 14, 2022

(30) Foreign Application Priority Data

Jan. 13, 2021 (CN) .......................... 202110045157.6

(51) Int. Cl.
*G01P 7/00* (2006.01)
*G01P 15/08* (2006.01)
*G01S 19/01* (2010.01)

(52) U.S. Cl.
CPC ................ *G01P 7/00* (2013.01); *G01P 15/08* (2013.01); *G01S 19/01* (2013.01)

(58) Field of Classification Search
CPC .... G01P 7/00; G01P 15/08; G01P 3/64; G01P 15/001; G01P 3/00; G01P 15/00; G01S 19/01; G01S 19/52; G06F 17/11
USPC ......................................................... 702/141
See application file for complete search history.

(56) References Cited

U.S. PATENT DOCUMENTS

| | | | |
|---|---|---|---|
| 2010/0325411 A1* | 12/2010 | Jung ........................ | H04W 8/22 713/100 |
| 2020/0082217 A1* | 3/2020 | So .......................... | G06F 18/2135 |
| 2020/0149894 A1* | 5/2020 | Park ........................ | G06V 40/25 |

FOREIGN PATENT DOCUMENTS

| | | | | |
|---|---|---|---|---|
| CN | 107543601 A | * | 1/2018 | |
| CN | 110703284 A | * | 1/2020 | ........... G01S 19/246 |
| CN | 111462116 A | * | 7/2020 | |

OTHER PUBLICATIONS

English translation for CN-110703284-A (Year: 2020).*
English translation for CN-111462116-A (Year: 2020).*
English translation for CN-107543601-A (Year: 2020).*

* cited by examiner

*Primary Examiner* — Lee E Rodak
*Assistant Examiner* — Byung Ro Lee
(74) *Attorney, Agent, or Firm* — Philip E. Levy; Eckert Seamans Cherin & Mellott, LLC

(57) ABSTRACT

Speed and acceleration calculation and measuring methods and devices based on a regularization algorithm are disclosed. Speed and acceleration are calculated using the following steps: (1) acquiring position data or displacement data; and (2) using the position data or displacement data to calculate the speed and the acceleration with a disclosed regularization method. The disclosed methods and systems avoid the issue of noise amplification that arises when speed and acceleration are measured by existing speed and acceleration devices at high sampling rates. Noise amplification is prevented by first expressing the relationship between position data or displacement data and speed or acceleration into a typical Volterra integral equation of the first kind, and then using the disclosed regularization method to calculate speed and acceleration, thus suppressing noise amplification (Continued)

and accurately extracting speed and acceleration signal values.

18 Claims, 11 Drawing Sheets

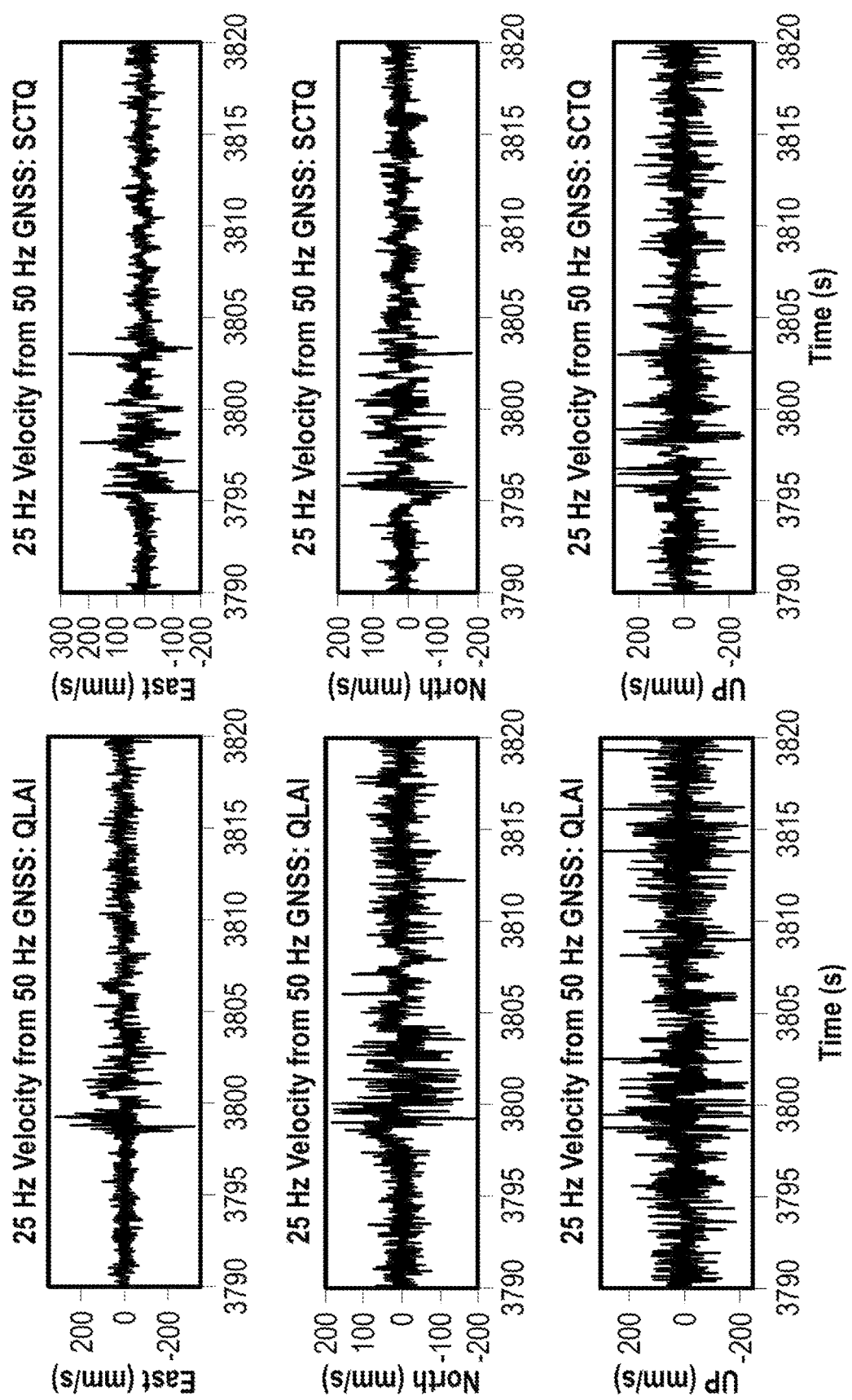

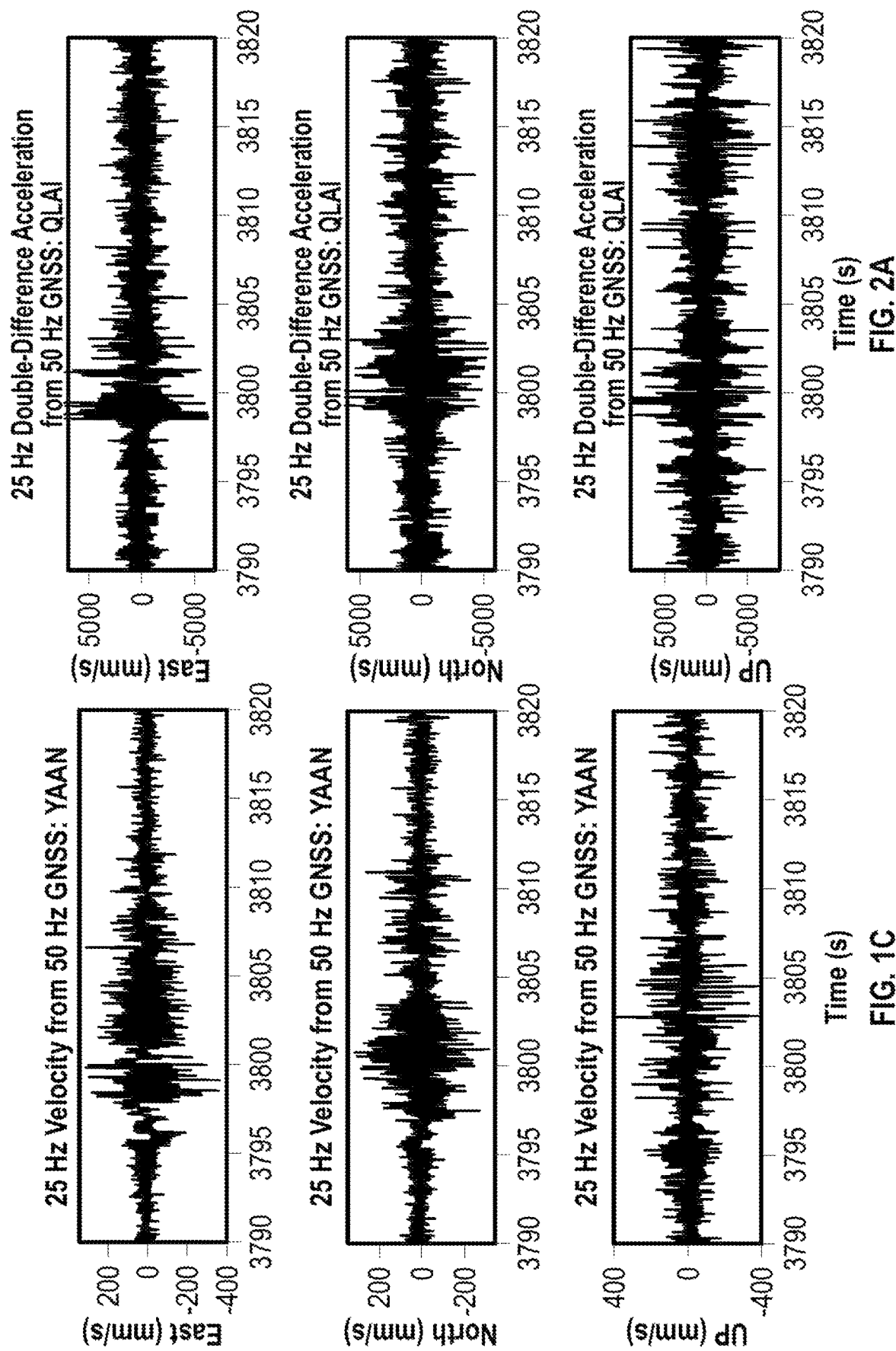

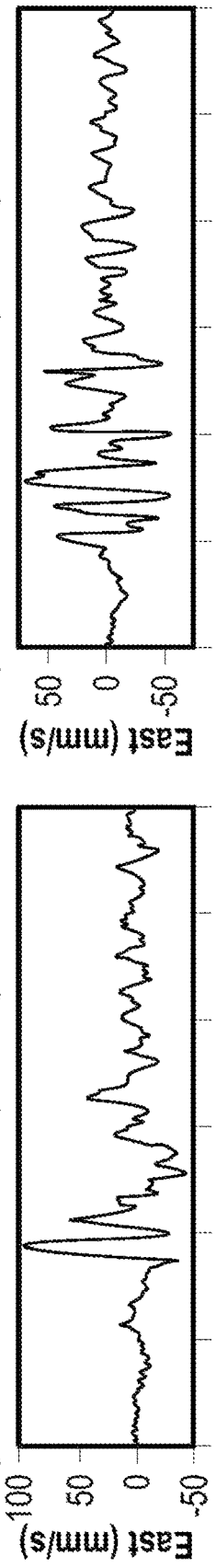
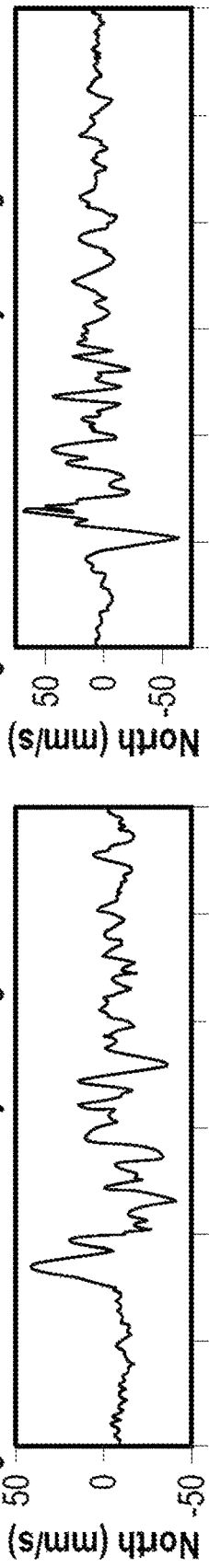
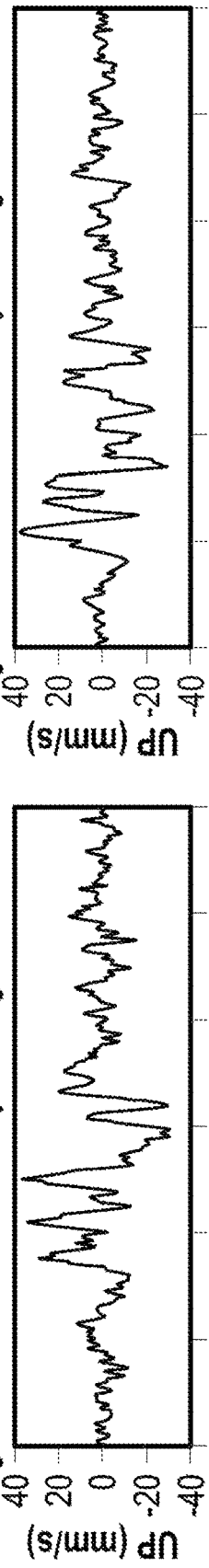
Fig. 9A
Fig. 9B

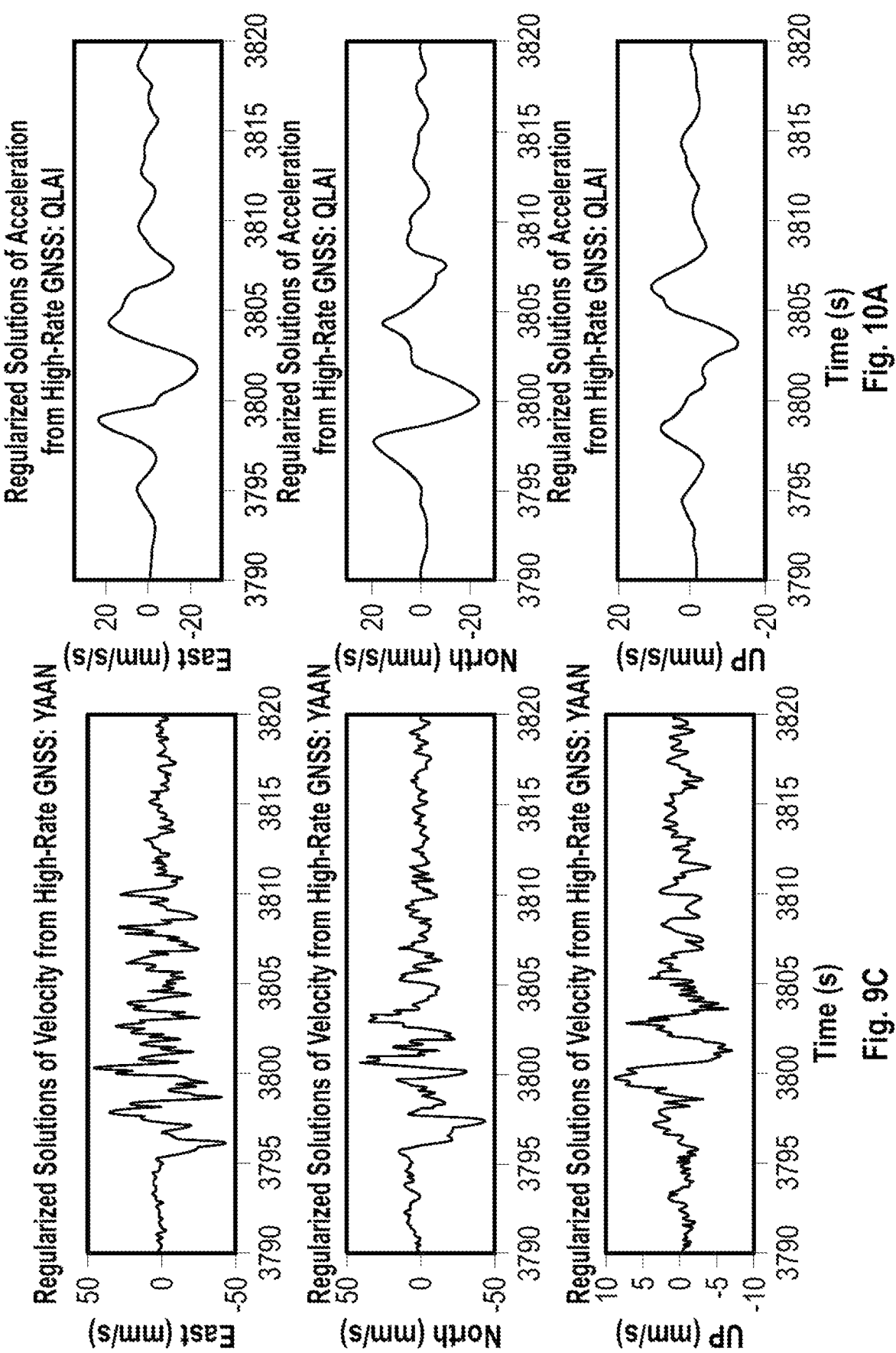

SPEED AND ACCELERATION CALCULATION AND MEASUREMENT METHOD, DEVICE, AND APPLICATION BASED ON REGULARIZATION ALGORITHMS

CROSS REFERENCE TO RELATED APPLICATIONS

This application claims priority to Chinese Patent Application No. 202110045157.6, filed Jan. 13, 2021, entitled Speed and acceleration calculation method and measurement device based on regularization algorithms.

FIELD OF THE INVENTION

The disclosed concept relates to methods, devices, and applications for calculating speed and acceleration, and specifically, to methods, devices, and applications for measuring and calculating speed and acceleration based on regularization algorithms.

BACKGROUND OF THE INVENTION

Currently, a variety of devices, hardware, instruments, and systems are available for performing speed and acceleration measurements. These include but not limited to: piezoelectric, piezoresistive, and capacitive type accelerometer devices, as well as devices based on global navigation satellite system (GNSS) technology, among others. In general, these types of measurement devices operate by: first, taking measurements in accordance with a known sampling rate and converting the acquired measurement data to equivalent position data or displacement data based on the known sampling rate; then, calculating and outputting speed and acceleration. Typically, for an accelerometer, the force exerted on the accelerometer creates a detectable signal of a proof mass with respect to the mechanical frame of the accelerometer. This signal is transformed to calculate the displacement as well as its response in the frequency domain, and then the corresponding inverse transform and filter are performed to produce output speed and acceleration. With GNSS devices, speed and acceleration are directly calculated by applying the single and double difference methods, respectively, to GNSS position data.

Although applying difference methods and the combined method of inverse transform and filter to position data or displacement data does output speed and acceleration, the speed and acceleration that are output using such methods exhibit several deficiencies. First, the calculation of speed and acceleration based on position data or displacement data can be converted into an equivalent Volterra integral equation of the first kind, which is a typical ill-posed problem. Increasing sampling rate greatly amplifies the noise of the position data or displacement data, causing the calculated speed and acceleration to be totally drowned in noise and consequently making it difficult to extract correct speed and acceleration from position data or displacement data. In fact, the output speed and acceleration can even be said to be erroneous. FIGS. 1A-1C show graphs of speed signals calculated with GNSS position data at a relatively high sampling rate, and FIGS. 2A-2C show graphs of acceleration signals calculated with GNSS position data at a relatively high sampling rate. These examples of using position data or displacement data obtained by GNSS at a relatively high sampling rate to calculate the speed and acceleration of a moving body are comprised almost entirely of noise. Both the speed and acceleration signals exhibit chaotic, seemingly instantaneous, fluctuations between high and low values with no discernible trends or patterns.

Conversely, if the sampling rate is lowered, the noise of the calculated speed and acceleration is controlled. However, a low sampling rate implies an average over a time interval, resulting in distortion of speed and acceleration signals. FIGS. 3A-3C show graphs of speed signals calculated with GNSS position data at a relatively low sampling rate, and FIGS. 4A-4C show graphs of acceleration signals calculated with GNSS position data at a relatively low sampling rate. These examples of using position data or displacement data at a relatively low sampling rate to calculate the speed and acceleration of a moving body are overly discretized. These examples further demonstrate that a low sampling rate prevents users from obtaining accurate speed and acceleration signals between two samples, especially instantaneous speed and acceleration signal values.

There is thus room for improvement in applications and devices for calculating and measuring speed and acceleration.

SUMMARY OF THE INVENTION

To address the aforementioned issues with existing speed and acceleration measurement devices, the present invention provides a speed and acceleration calculation method, calculation devices, and speed and acceleration measurement devices and applications based on regularization algorithms. In conditions of high sampling rate, the embodiments of the present invention greatly mitigate the inherent issue of noise amplification, thus guaranteeing the stability and accuracy of output speed and acceleration signals, guaranteeing the stability and accuracy of instantaneous speed and acceleration signals, and avoiding the issue of distortion of speed and acceleration signals.

In one exemplary embodiment, a method for calculating speed or acceleration based on regularization algorithms comprises: acquiring position data or displacement data; and using a regularization method to calculate speed or acceleration with the position data or displacement data.

The method can further comprise: expressing the position data or displacement data as an integral equation of speed or acceleration, and discretizing the integral equation to obtain the matrix form of a linear discrete observation equation, wherein the matrix form is expressed as $y = A\beta + \varepsilon$, and wherein $\beta$ is a speed or acceleration vector and wherein $y$ is a vector of the position data or displacement data; and using the regularization method to recover the speed or acceleration values $\beta$ from the position data or displacement data $y$.

Using the regularization method to recover the speed or acceleration values $\beta$ from the position data or displacement data $y$ can further comprise: building an objective function based on the discretized integral equation of speed or acceleration, wherein the objective function is expressed as min: $F(\beta) = (y - A\beta)^T W(y - A\beta) + \kappa \beta^T S \beta$, and wherein $W$ is a weight matrix of the position data or displacement data, $\kappa$ is a regularization parameter, and $S$ is a positive definite or positive semi-definite matrix; and determining the regularization parameter $\kappa$ and recovering the speed or acceleration values $\beta$ from the position data or displacement data $y$ by using the equation: $\beta = (A^T W A + \kappa S)^{-1} A^T W y$. Determining the regularization parameter $\kappa$ can comprise using the minimum mean squared error method.

The regularization method can alternatively comprise any one of: the generalized cross validation (GCV) method, the L curve method with the 2-norm of the residual errors and parameters, the truncated singular value decomposition method by discarding some smallest eigenvalues, Akaike Bayesian information criterion (ABIC), or the L1L2 norm minimization method. Acquiring the position data or displacement data can comprise using a GNSS device or an acceleration measurement device.

In another exemplary embodiment, a device for calculating speed or acceleration based on a regularization algorithm comprises: an acquisition module configured to acquire position data or displacement data; and a regularization module configured to use a regularization method to calculate speed or acceleration by using the position data or displacement data.

The regularization module can further comprise: a discretization module configured to discretize an integral equation of speed or acceleration in order to obtain the matrix form of a linear discrete observation equation, wherein the matrix form is expressed as y=Aβ+ε, wherein y is a vector of the position data or displacement data, wherein A is a discrete coefficient matrix, wherein β is a speed or acceleration vector, and wherein ε is a random error vector of the position data or displacement data; and a recovery module configured to recover the speed or acceleration vector β from the position data or displacement data y by using a regularization method. The recovery module can be further configured to: build an optimization objective function, wherein the objective function is expressed as min: $F(β)=(y-Aβ)^T W (y-Aβ)+κβ^T Sβ$, wherein W is a weight matrix of the position data or displacement data, wherein κ is a regularization parameter, and wherein S is a positive definite or positive semi-definite matrix; and determine the regularization parameter κ and recover the speed or acceleration vector β from the position data or displacement data y by using the following equation: $β=(A^T WA+κS)^{-1}A^T Wy$. The recovery module can additionally be configured to determine the regularization parameter κ using the minimum mean squared error method.

The recovery module can be alternatively configured to use any of the following regularization methods: the generalized cross validation (GCV) method, the L curve method with the 2-norm of the residual errors and parameters, the truncated singular value decomposition method by discarding some smallest eigenvalues, Akaike Bayesian information criterion (ABIC), or the L1L2 norm minimization method.

In the other exemplary embodiment, a device for measuring speed and/or acceleration based on a regularization algorithm comprises: a device to output position data or displacement data; and any of the aforementioned calculation devices to calculate speed and/or acceleration by using a regularization algorithm and output the calculated results.

Any of the aforementioned calculation devices and/or the measurement device can be structured to be a component of any of: an accelerometer, a seismograph, a vibration and shock detection sensor, an inertial measurement unit, a gravimeter, an AED, an airbag deployment system, a stepping board, or a free-fall sensor.

BRIEF DESCRIPTION OF THE DRAWINGS

A full understanding of the invention can be gained from the following description of the preferred embodiments when read in conjunction with the accompanying drawings in which:

FIGS. 1A, 1B, and 1C are graphs of speed signals output by a typical speed measurement device that performs calculations using the difference method on position data detected at a relatively high sampling rate;

FIGS. 2A, 2B, and 2C are graphs of acceleration signals output by a typical acceleration measurement device that performs calculations using the double difference method on position data detected at a relatively high sampling rate;

FIGS. 9A, 9B, and 9C are 25 Hz speed diagrams obtained from calculation with the regularization method disclosed herein, in accordance with exemplary embodiments of the disclosed concept; and FIGS. 10A, 10B, and 10C are 25 Hz acceleration diagrams obtained from calculation with the regularization method disclosed herein, in accordance with exemplary embodiments of the disclosed concept.

DETAILED DESCRIPTION OF THE INVENTION

Figures 2B, 2C:
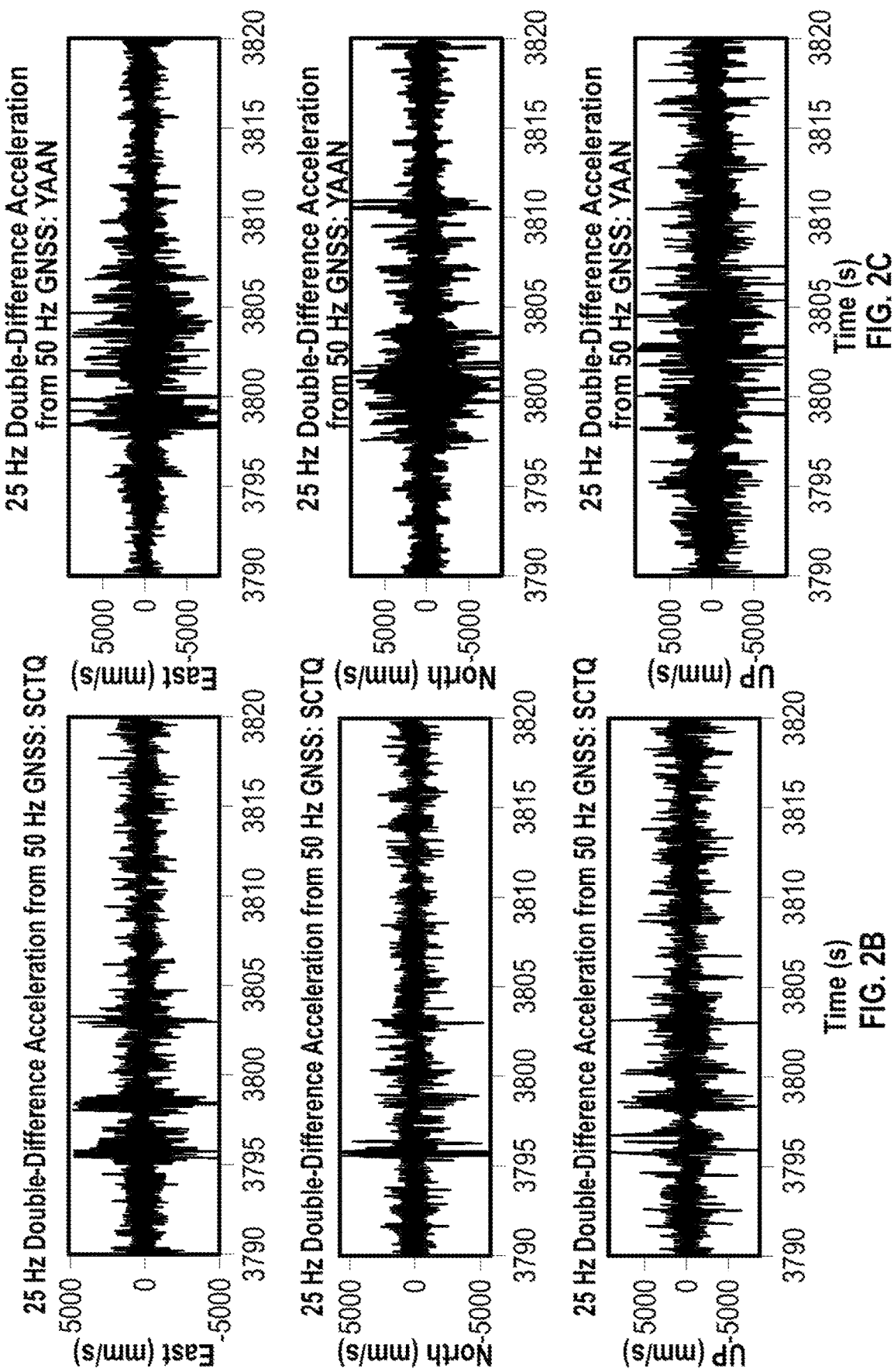
Figures 3A, 3B:
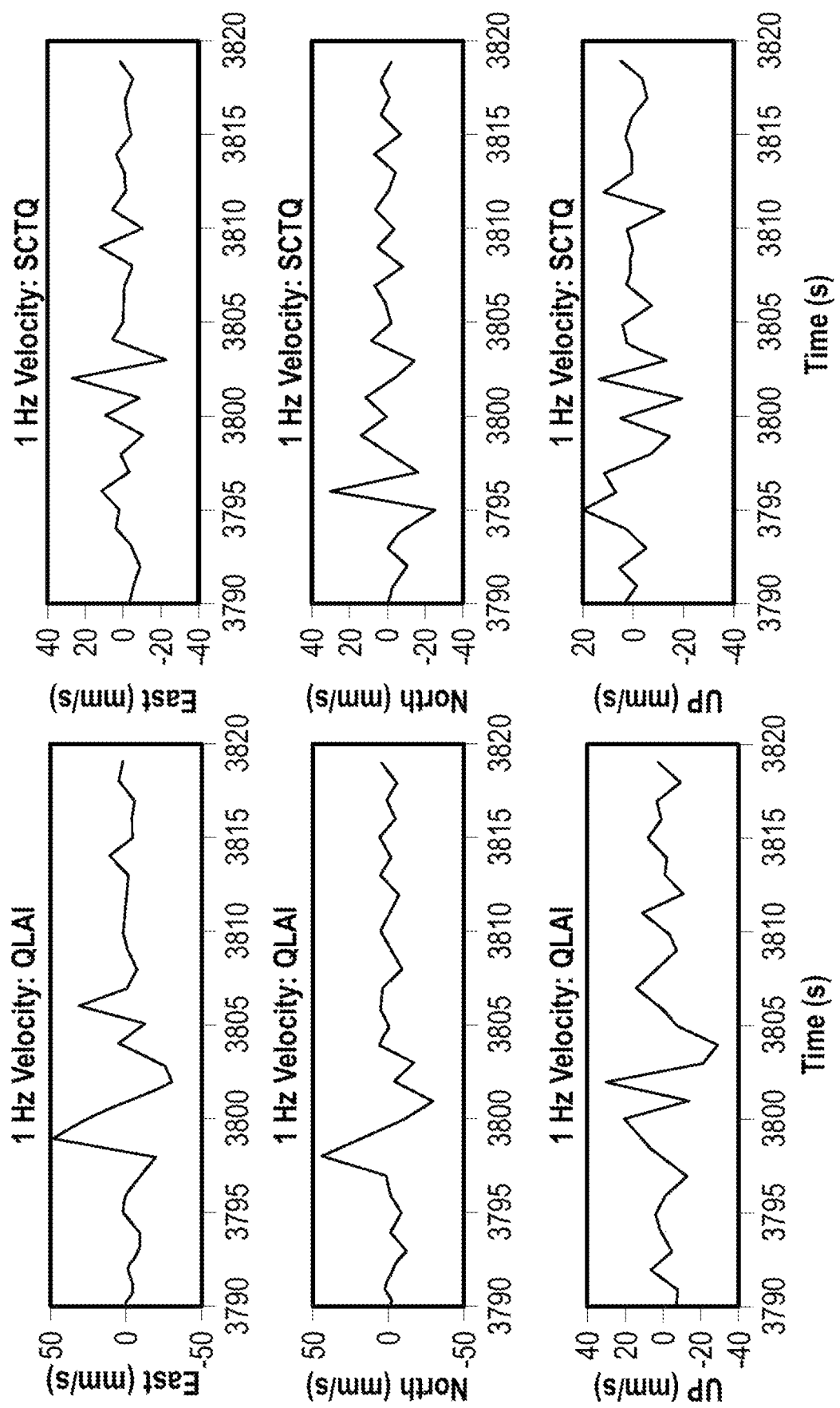
FIGS. 3A, 3B, and 3C are graphs of speed signals output by a typical speed measurement device that performs calculations using the difference method on position data detected at a relatively low sampling rate.
Figures 3C, 4A:
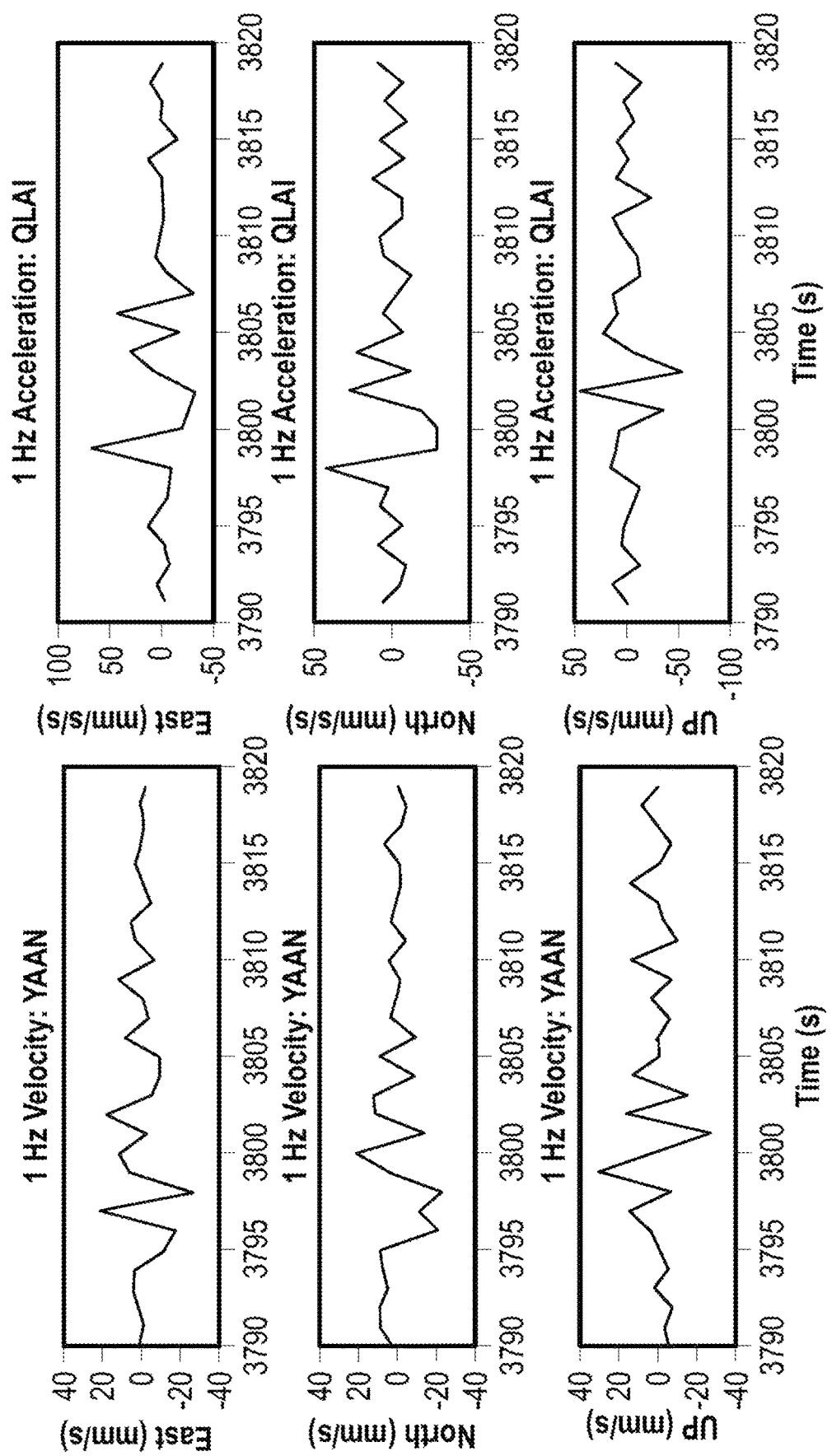
FIGS. 4A, 4B, and 4C are graphs of acceleration signals output by a typical acceleration measurement device that performs calculations using the double difference method on position data detected at a relatively low sampling rate.
Figures 4B, 4C:
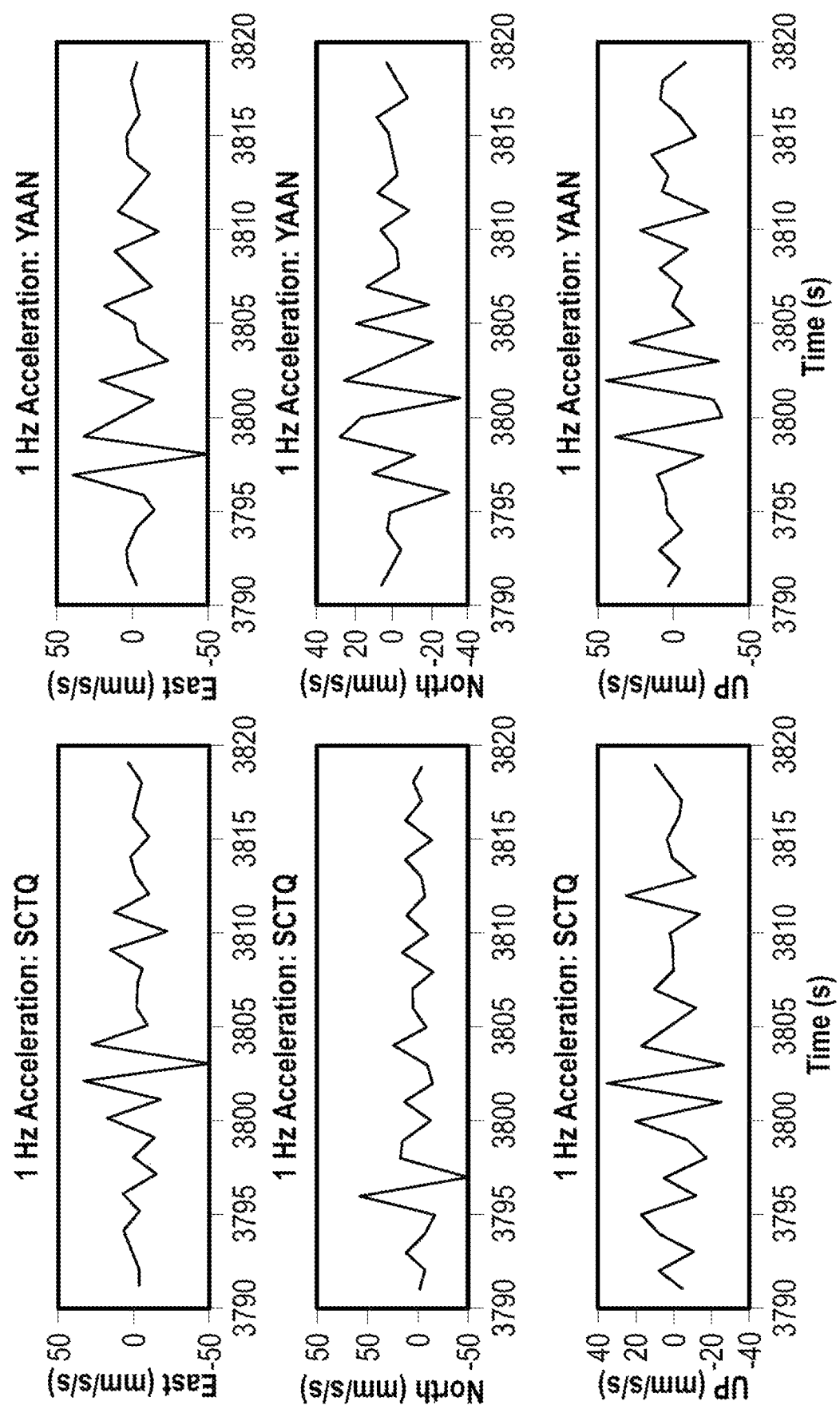

As used herein, the singular form of "a", "an", and "the" include plural references unless the context clearly dictates otherwise.

As used herein, the statement that two or more parts or components are "coupled" shall mean that the parts are joined or operate together either directly or indirectly, i.e., through one or more intermediate parts or components, so long as a link occurs As used herein, the term "controller" shall mean a number of programmable analog and/or digital devices (including an associated memory part or portion) that can store, retrieve, execute and process data (e.g., software routines and/or information used by such routines), including, without limitation, a field programmable gate array (FPGA), a complex programmable logic device (CPLD), a programmable system on a chip (PSOC), an application specific integrated circuit (ASIC), a microprocessor, a microcontroller, a programmable logic controller, or any other suitable processing device or apparatus. The memory portion can be any one or more of a variety of types of internal and/or external storage media such as, without limitation, RAM, ROM, EPROM(s), EEPROM(s), FLASH, and the like that provide a storage register, i.e., a non-transitory machine readable medium, for data and program code storage such as in the fashion of an internal storage area of a computer, and can be volatile memory or nonvolatile memory.

As used herein, the term "number" shall mean one or an integer greater than one (i.e., a plurality).

As used herein, "regularization" shall refer to a mathematical method that is applied to solve an ill-posed problem and obtain a stable and accurate solution.

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

In order to effectively describe the exemplary embodiments of the present invention, a set of Equations (1)-(8) is first detailed herein below. Equations (1)-(8) are used to calculate speed and acceleration by applying Equations (5)-(8) to integral equations of speed and acceleration based on position data or displacement data. Equations (5)-(8) can be referred to as "regularization equations", and are referenced throughout the present disclosure in order to detail the various exemplary embodiments of regularization methods disclosed herein.

The following differential equation conveys the physical definition of speed:

$$\frac{dr(t)}{dt} = v(t) \tag{1}$$

where r(t) is the position at time t, and v(t) is the speed of a moving body at time t. Differential equation (1) can be equivalently written as the following speed integral equation:

$$r(t) = \int_{t_0}^{t} v(\tau) d\tau + r(t_0) \tag{2}$$

where $r(t_0)$ is the position at initial time $t_0$. When integral equation (2) is applied to a moving body, $v(\tau)$ is the speed of that body at time t. In an accelerometer, the displacement of the proof mass with respect to the mechanical frame of the accelerometer at time t is obtained by subtracting $r(t_0)$ from r(t). Integral equation (2) is a Volterra integral equation of the first kind and is a typical ill-posed problem that raises the issue of significant amplification of observation errors. Applying the difference method or the combined method of inverse transform and filter greatly amplifies the noise of displacement data or position data, thus making it difficult to extract accurate speed signals from displacement data or position data.

Similarly to speed differential equation (1), there is also a corresponding differential equation for acceleration:

$$\frac{d^2 r(t)}{dt^2} = a(t, r(t)) \tag{3}$$

where a(t) is the acceleration of a moving body at time t. The equivalent acceleration integral equation of differential equation (3) is:

$$r(t) = \int_{t_0}^{t} (t-\tau) a(\tau, r(\tau)) d\tau + (t-t_0) v(t_0) + r(t_0) \tag{4}$$

where $v(t_0)$ is speed at initial time $t_0$. Integral equation (4) is also a Volterra integral equation of the first kind and is also a typical ill-posed problem. Similarly to integral equation (2), integral equation (4) also poses the problem of significant amplification of observation errors, wherein the higher the sampling rate, the more significant error amplification is. The error amplification results in the acceleration signal being totally drowned in the amplified noise.

In accordance with exemplary embodiments of the disclosed concept, a regularization method can be used to obtain accurate speed and acceleration signals from position data or displacement data. In exemplary embodiments of the disclosed concept, the regularization method comprises applying Equations (5) through (8) (which are detailed hereinafter) to either integral Equation (2) or integral Equation (4). First, the corresponding integral equation (2) or (4) is discretized, with the observation error taken into account, to obtain discrete observation equation (5):

$$y(t) = \alpha_t \beta + \varepsilon_t \tag{5}$$

where y(t) is a position data or displacement data, at is a discrete coefficient row vector, β is a parameter vector to be estimated, and et is a random error of position data or displacement measurement. When the discrete equation corresponds to speed integral equation (2), β is a vector of the unknown speed parameters. When the discrete equation corresponds to acceleration integral equation (4), β is a vector of the unknown acceleration parameters. Denoting y as a column vector of all position data or displacement data enables discrete equation (5) to be expressed in matrix form:

$$y = A\beta + \varepsilon \tag{6}$$

where y is a vector of position data or displacement data, A is a discrete coefficient matrix, β is a speed or acceleration vector, and ε is a random error vector of the position data or displacement data.

Since linear observation equation (6) comes from a Volterra integral equation of the first kind, the coefficient matrix is ill-conditioned such that the increase in sampling rate will greatly amplify random observation errors. Therefore, in accordance with exemplary embodiments of the disclosed concept, the disclosed regularization method is used to suppress noise amplification and accurately extract speed and acceleration signal values. Its corresponding optimization objective function (7) is expressed as follows:

$$\min: F(\beta) = (y - A\beta)^T W (y - A\beta) + \kappa \beta^T S \beta \tag{7}$$

where W is a weight matrix of position data or displacement data, κ is a regularization parameter, and S is a positive definite or positive semi-definite matrix. The solution to the optimization problem (7) can be expressed as follows:

$$\beta = (A^T W A + \kappa S)^{-1} A^T W y \tag{8}$$

In this disclosed method, choosing an appropriate regularization parameter κ suppresses noise amplification, and results in accurate extraction of speed and acceleration signal values. Several exemplary embodiments of methods for choosing regularization parameter κ are detailed later herein with respect to step 206 of a calculation method 200 shown in FIG. 7.

Embodiment 1

Figure 5:
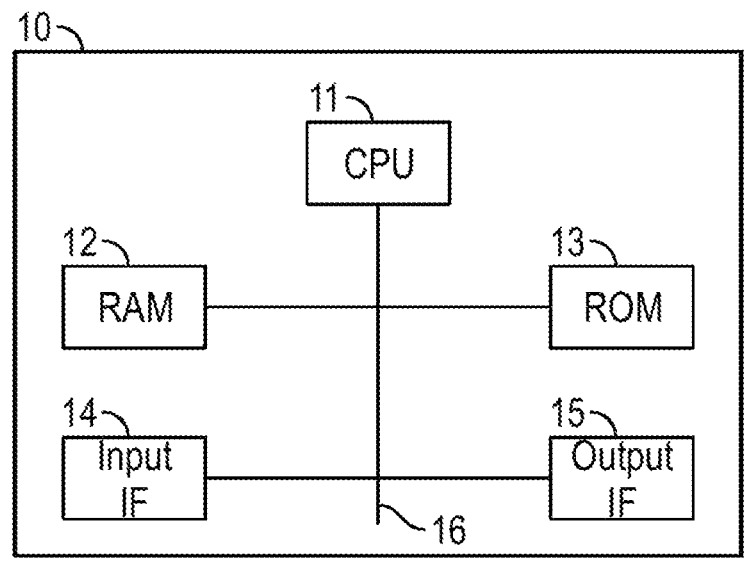
FIG. 5 is schematic representation of a device that executes a speed or acceleration calculation method based on a regularization algorithm disclosed herein, in accordance with exemplary embodiments of the disclosed concept.

FIG. 5 is a block diagram showing the components of a controller 10 that is configured to execute a speed or acceleration calculation method based on a regularization algorithm, in accordance with exemplary embodiments of the disclosed concept. As shown in FIG. 5, controller 10 comprises a plurality of hardware components, including: a CPU 11 that performs calculations, a RAM 12 that stores temporary information, a ROM 13 that stores a computer program with instructions for performing the calculation process, an input IF 14 for inputting position data or displacement data, and an output IF 15 for outputting a calculation result. Each of these hardware components is connected to all of the other hardware components via a bus 16. The CPU 11 loads the computer program stored in the ROM 13 into the RAM 12, and performs the processing necessary for executing the calculation method of the present invention based on the loaded computer program.

Embodiment 2

Figure 6:
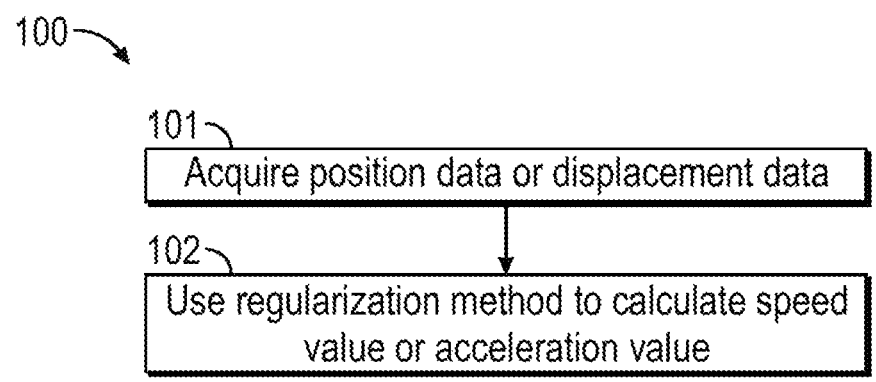
FIG. 6 is a flow chart of a method for calculating speed or acceleration based on a regularization algorithm, in accordance with exemplary embodiments of the disclosed concept.

FIG. 6 is a flow chart of a method 100 for calculating speed or acceleration based on a regularization algorithm, in accordance with an exemplary embodiment of the disclosed concept. The method shown in FIG. 6 may be employed, for example, with the controller 10 shown in FIG. 5. However, it will be appreciated that the method may be employed in other devices as well without departing from the scope of the disclosed concept. Step 101 is an acquisition step, wherein position data or displacement data is observed and acquired. If method 100 is executed by controller 10, then at step 101, the CPU 11 acquires the position data or displacement data via the input IF 14. Step 102 is a calculation step, wherein speed or acceleration is calculated by applying a regularization method (embodiments of which are detailed later herein) to the acquired position data or displacement data. If method 100 is executed by controller 10, then at step 102, CPU 11 calculates speed or acceleration by applying a regularization method to the position data or displacement data. In an exemplary embodiment of step 102, Equations (1), (2), and (5)-(8) are used to calculate speed, and Equations (3), (4), and (5)-(8) are used to calculate acceleration.

Embodiment 3

Figure 7:
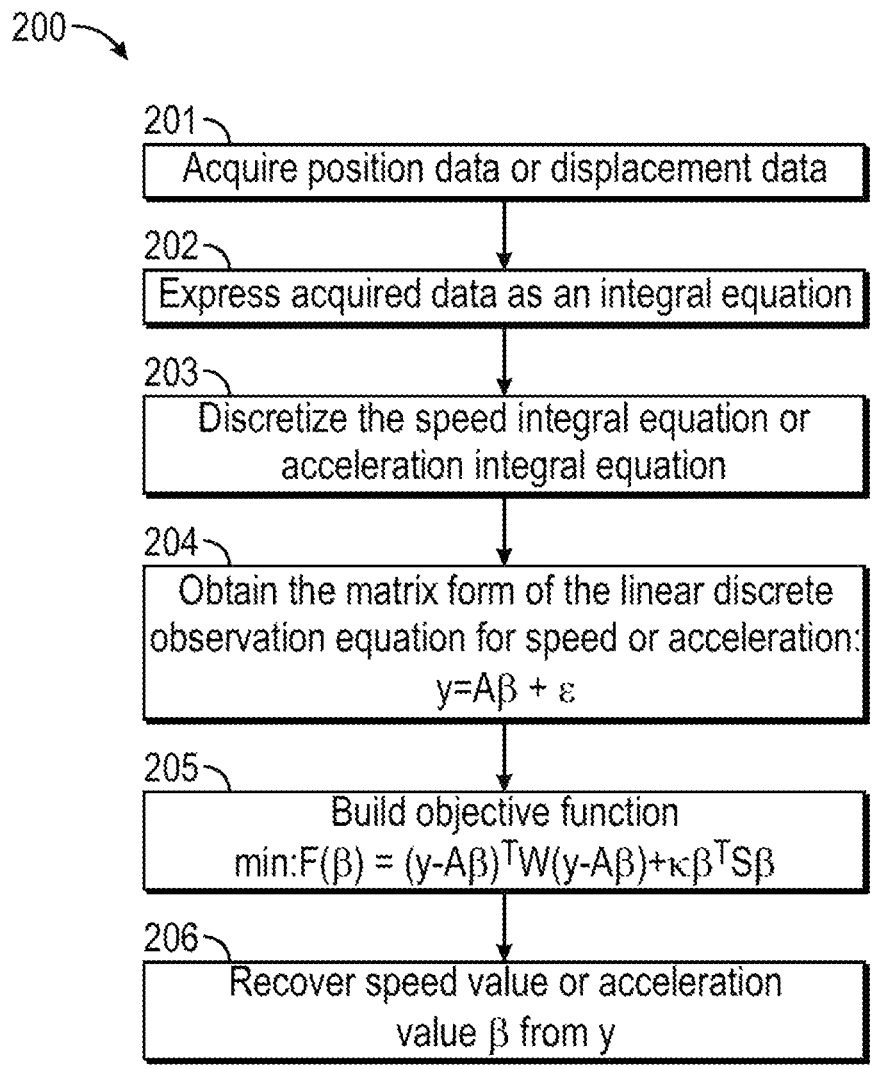
FIG. 7 is a flow chart of a method for calculating speed or acceleration based on a regularization algorithm, based on specific embodiments of the steps of the method shown in FIG. 6, in accordance with exemplary embodiments of the disclosed concept.

FIG. 7 is a flow chart of a method 200 for calculating speed or acceleration based on a regularization algorithm, in accordance with additional exemplary embodiments of the disclosed concept. The calculation method 200 provides details of specific embodiments of the steps of method 100. Specifically, step 201 of method 200 is directed toward exemplary embodiments of step 101 of method 100, and steps 202-206 are directed toward exemplary embodiments of step 102 of method 100.

At step 201, position data or displacement data is acquired using, for example and without limitation, a GNSS device or an acceleration measurement device. At step 202, the position data or displacement data is expressed as an integral equation of speed or acceleration, in accordance with either Equation (2) or Equation (4). At step 203, the speed or acceleration integral equation is discretized in accordance with Equation (5). This enables the matrix form of the linear discrete observation equation to be obtained in accordance with Equation (6) at step 204.

At step 205, an objective function is built in accordance with Equation (7). As previously stated, Equation (8) denotes the solution to the optimization problem expressed by Equation (7), and is written as follows:

$$\beta = (A^T W A + \kappa S)^{-1} A^T W y \quad (8)$$

where β is the speed or acceleration vector obtained from the position data or displacement data y, and κ is a regularization parameter chosen to suppress noise amplification. Several methods are suitable for use as a regularization method and for determining the regularization parameter κ, and it should be noted that any one of these methods can be used as a regularization method or to determine κ without departing from the scope of the disclosed concept. Non-limiting exemplary embodiments of the methods suitable for regularization or determining K include: using the minimum mean squared error method, using experience, using the generalized cross validation (GCV) method, using the L curve method with the 2-norm of the residual errors and parameters, using the truncated singular value decomposition method by discarding some of the smallest eigenvalues, using Akaike Bayesian information criterion (ABIC), and using the L1L2 norm minimization method.

Embodiment 4

Figure 8:
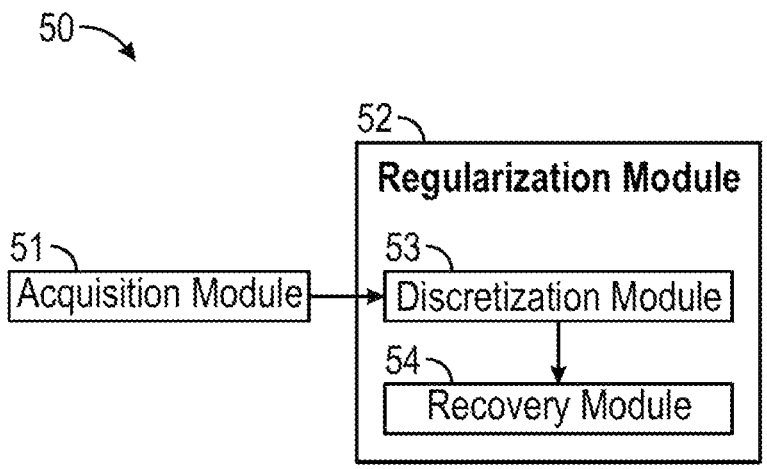
FIG. 8 is a speed and/or acceleration calculation and measurement device that calculates and measures speed and/or acceleration based on regularization algorithms disclosed herein, in accordance with exemplary embodiments of the disclosed concept.

Referring now to FIG. 8, a speed and/or acceleration calculation device 50 is shown. Calculation device 50 calculates speed and/or acceleration based on regularization algorithms disclosed in accordance with exemplary embodiments of the disclosed concept. Calculation device 50 can, for example and without limitation, execute method 100 or method 200. As shown in FIG. 8, calculation device 50 comprises a plurality of modules, including: an acquisition module 51, which acquires position data or displacement data; and a regularization module 52, which can execute the regularization methods disclosed herein to calculate speed and/or acceleration using the position data or displacement data acquired by acquisition module 51. Acquisition module 51 can, for example and without limitation, comprise an acceleration measurement device or use a GNSS device. Regularization module 52 can, for example and without limitation, execute steps 202-206 of calculation method 200. In addition, regularization module 52 can comprise, for example and without limitation, controller 10 shown in FIG. 5.

Embodiment 5

Still referring to FIG. 8, regularization module 52 can be optimized by further comprising a discretization module 53 and a recovery module 54 by using a regularization algorithm. Discretization module 53 discretizes the speed integral equation (2) or acceleration integral equation (4) and obtains the corresponding speed or acceleration linear discrete observation equation (6). Recovery module 54 then recovers the speed or acceleration values by building the optimization objective function in accordance with Equation (7), and then determining the regularization parameter κ using any of a number of suitable regularization methods in order to determine the values of β (i.e. speed or acceleration) in Equation (8). Suitable methods for regularization and determining the regularization parameter κ include: the minimum mean squared error method, the generalized cross validation (GC V) method, the L curve method with the 2-norm of the residual errors and parameters, the truncated singular value decomposition method by discarding some smallest eigenvalues, Akaike Bayesian information criterion (ABIC), and the L1L2 norm minimization method.

Embodiment 6

In another exemplary embodiment of the disclosed concept, a speed and/or acceleration measurement device based on regularization algorithms comprises: a device to output position data or displacement data; and any of the aforementioned calculation devices to calculate speed and/or acceleration and output the calculated results, as conceptually shown in FIG. 6 or FIG. 8. Data acquisition module in FIG. 8 can, for example and without limitation, comprise an acceleration measurement device or use a GNSS device.

Embodiment 7

Any of the aforementioned calculation devices and/or the measurement devices of exemplary Embodiment 6 can be implemented in a wide variety of devices, including but not limited to: an accelerometer, a seismograph, a vibration and shock detection sensor, an inertial measurement unit, a gravimeter, an automated external defibrillator (AED), an airbag deployment system, a stepping board, and a free-fall sensor, as well as other devices that include speed or acceleration measurement functionality.

Embodiment 8

To acquire position data or displacement data, one exemplary embodiment of the present invention first uses 50 Hz GNSS pseudo-range and carrier phase observations of station QLAI and uses the GNSS precise point positioning method for calculations to obtain the 50 Hz position data of the station, and then uses one of the regularization algorithms disclosed herein (i.e. in accordance with an embodiment of either method 100 or method 200) to effectively and accurately extract the speed and acceleration signals at 25 Hz. FIG. 9A and FIG. 10A show that both speed signals (FIG. 9A) and acceleration signals (FIG. 10A) recovered in accordance with the present invention indicate a normal change pattern.

Unlike the chaotic speed values obtained using the difference method as shown in FIG. 1A, the present invention recovers the stable and accurate speed waveforms, as shown in FIG. 9A. By comparing the speed values calculated through the difference method as shown in FIG. 1A and the speed values calculated using the regularization algorithm in accordance with the present invention as shown in FIG. 9A, it can be seen that, for a given sampling rate, the maximum speed obtained through the difference method is greater than the maximum speed obtained through the present invention by a factor of approximately 7.5, 5.4, and 9.7 in the local east-west, north-south, and vertical directions, respectively. Unlike the chaotic acceleration values obtained using the double difference method as shown in FIG. 2A, the present invention recovers the stable and accurate acceleration waveforms, as shown in FIG. 10A. By comparing the acceleration values obtained through the double difference method as shown in FIG. 2A and the acceleration values calculated using the regularization algorithm in accordance with the present invention as shown in FIG. 10A, it can be seen that, for a given sampling rate, the maximum acceleration calculated through the double difference method is greater than the maximum acceleration calculated through the present invention by a factor of approximately 390.4 times, 366.4 times, and 910.8 times in the local east-west, north-south, and vertical directions, respectively.

Embodiment 9

Figures 10B, 10C:
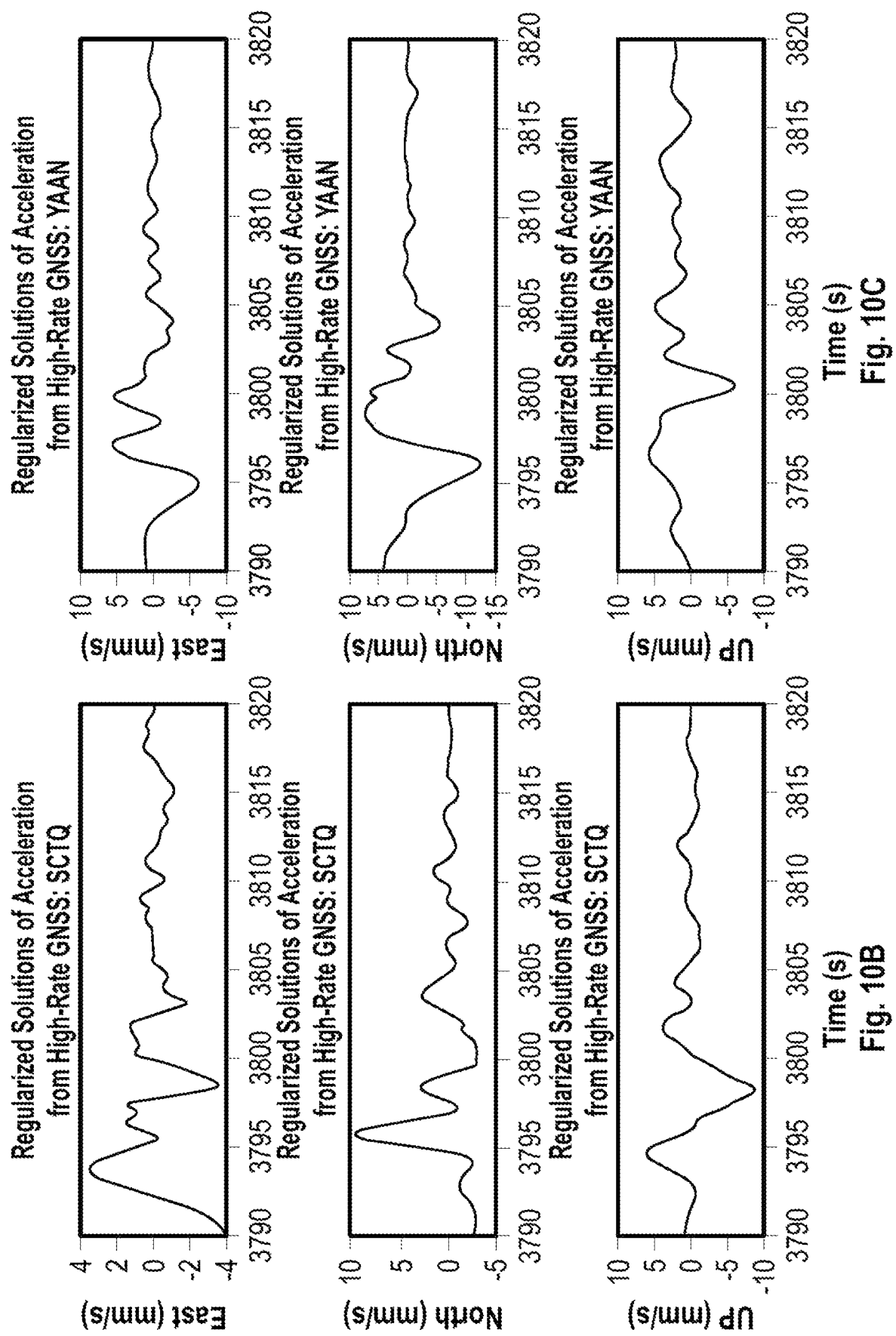

To acquire position data or displacement data, one exemplary embodiment of the present invention first uses 50 Hz GNSS pseudo-range and carrier phase observations of station SCTQ and uses the GNSS precise point positioning method for calculations to obtain the 50 Hz position data of the station, and then uses one of the regularization algorithms disclosed herein (i.e. in accordance with an embodiment of either method 100 or method 200) to effectively and accurately extract the speed and acceleration signals at 25 Hz. FIG. 9B and. FIG. 10B show that both speed signals (FIG. 9B) and acceleration signals (FIG. 10B) recovered in accordance with the present invention indicate a normal change pattern.

Unlike the chaotic speed values obtained using the difference method as shown in FIG. 1B, the present invention recovers the stable and accurate speed waveforms, as shown in FIG. 9B. By comparing the speed values calculated through the difference method as shown in FIG. 1B and the speed values calculated using the regularization algorithm in accordance with the present invention as shown in FIG. 9B, it can be seen that, for a given sampling rate, the maximum speed obtained through the difference method is greater than the maximum speed obtained through the present invention by a factor of approximately 7.2, 3.6, and 13.4 in the local east-west, north-south, and vertical directions, respectively. Unlike the chaotic acceleration values obtained using the double difference method as shown in FIG. 2B, the present invention recovers the stable and accurate acceleration waveforms, as shown in FIG. 10B. By comparing the acceleration values obtained through the double difference method as shown in FIG. 2B and the acceleration values calculated using the regularization algorithm in accordance with the present invention as shown in FIG. 10B, it can be seen that, for a given sampling rate, the maximum acceleration calculated through the double difference method is greater than the maximum acceleration calculated through the present invention by a factor of approximately 1977.2 times, 2444.4 times, and 1606.0 times in the local east-west, north-south, and vertical directions, respectively.

Embodiment 10

To acquire position data or displacement data, one exemplary embodiment of the present invention first uses 50 Hz GNSS pseudo-range and carrier phase observations of station YAAN and uses the GNSS precise point positioning method for calculations to obtain the 50 Hz position data of the station, and then uses one of the regularization algorithms disclosed herein (i.e. in accordance with an embodiment of either method 100 or method 200) to effectively and accurately extract the speed and acceleration signals at 25 Hz. FIG. 9C and FIG. 10C show that both speed signals (FIG. 9C) and acceleration signals (FIG. 10C) recovered in accordance with the present invention indicate a normal change pattern.

Unlike the chaotic speed values obtained using the difference method as shown in FIG. 1C, the present invention recovers the stable and accurate speed waveforms, as shown in FIG. 9C. By comparing the speed values calculated through the difference method as shown in FIG. 1C and the speed values calculated using the regularization algorithm in accordance with the present invention as shown in FIG. 9C, it can be seen that, for a given sampling rate, the maximum speed obtained through the difference method is greater than the maximum speed obtained through the present invention by a factor of approximately 9.0, 7.8, and 13.6 in the local east-west, north-south, and vertical directions, respectively. Unlike the chaotic acceleration values obtained using the double difference method as shown in FIG. 2C, the present invention recovers the stable and accurate acceleration waveforms, as shown in FIG. 10C. By comparing the acceleration values obtained through the double difference method as shown in FIG. 2C and the acceleration values calculated using the regularization algorithm in accordance with the present invention as shown in FIG. 10C, it can be seen that, for a given sampling rate, the maximum acceleration calculated through the double difference method is greater than the maximum acceleration calculated through the present invention by a factor of approximately 2095.5 times, 1283.1 times, and 2122.7 times in the local east-west, north-south, and vertical directions, respectively.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof.

What is claimed is:

1. A method for calculating speed and/or acceleration based on a regularization algorithm in a device structured to determine speed and/or acceleration of a moving body, the method comprising:
   acquiring position data or displacement data for the moving body using a physical sensing device of an accelerometer or a global navigation satellite system (GNSS) device; and
   in a controller of the device, using a regularization method to calculate speed and/or acceleration using the position data or displacement data, wherein using the regularization method to calculate speed and/or acceleration comprises:
   expressing the position data or displacement data as an integral equation of speed or acceleration,
   discretizing the integral equation to obtain the matrix form of a linear discrete observation equation, wherein the matrix form is expressed as $y=A\beta+\varepsilon$, wherein A is a discrete coefficient matrix, wherein $\beta$ is a speed or acceleration vector, wherein $\varepsilon$ is a random error vector of the position data or displacement data, and wherein y is a vector of the position data or displacement data,
   recovering the speed or acceleration vector $\beta$ from the position data or displacement data y, including building an objective function based on the discretized integral equation of speed or acceleration, wherein the objective function is expressed as min: $F(\beta)=(y-A\beta)^T W(y-A\beta)+\kappa\beta^T S\beta$, and wherein W is a weight matrix of the position data or displacement data, $\kappa$ is a regularization parameter for suppressing noise amplification, and S is a positive definite or positive semi-definite matrix, and determining the regularization parameter $\kappa$ and recovering the speed or acceleration vector $\beta$ from the position data or displacement data y by using the following equation: $\beta=(A^T WA+\kappa S)^{-1} A^T Wy$;
   generating in the controller a speed or acceleration signal based on the speed or acceleration vector $\beta$ and causing the speed or acceleration signal to be output from the device.

2. The method of claim 1, wherein determining the regularization parameter $\kappa$ comprises using the minimum mean squared error method.

3. The method of claim 1, wherein the device is any of: an accelerometer, a seismograph, a vibration and shock detection sensor, an inertial measurement unit, a gravimeter, an AED, an airbag deployment system, a stepping board, or a free-fall sensor.

4. The method of claim 1, wherein the regularization method comprises one of: the generalized cross validation (GCV) method, the L curve method with the 2-norm of the residual errors and parameters, the truncated singular value decomposition method by discarding some smallest eigenvalues, Akaike Bayesian information criterion (ABIC), or the L1L2 norm minimization method.

5. The method of claim 1, wherein the physical sensing device is configured to generate a detectable signal in response to a force acting on the physical sensing device, and wherein the position data or displacement data for the moving body is derived from the detectable signal.

6. The method of claim 5, wherein the physical sensing device is one of a piezoelectric sensing device, a piezoresistive sensing device, or a capacitive sensing device.

7. A device for calculating speed and/or acceleration of a moving body based on a regularization algorithm, the device comprising:
   a controller including: (i) an acquisition module configured to acquire position data or displacement data for the moving body using a physical sensing device of an accelerometer or a global navigation satellite system (GNSS) device; and (ii) a regularization module configured to express the position data or displacement data as an integral equation of speed or acceleration and to use a regularization method to calculate speed and/or acceleration by using the position data or displacement data, the regularization module comprising:
   a discretization module configured to discretize the integral equation of speed or acceleration in order to obtain the matrix form of a linear discrete observation equation, wherein the matrix form is expressed as $y=A\beta+\varepsilon$, wherein y is a vector of the position data or displacement data, wherein A is a discrete coefficient matrix, wherein $\beta$ is a speed or acceleration vector, and wherein $\varepsilon$ is a random error vector of the position data or displacement data; and
   a recovery module configured to recover the speed or acceleration vector $\beta$ from the position or displacement data y, wherein the recovery module is further configured to build an optimization objective function, wherein the objective function is expressed as min: $F(\beta)=(y-A\beta)^T W(y-A\beta)+\kappa\beta^T S\beta$, wherein W is a weight matrix of the position data or displacement data, wherein k is a regularization parameter for suppressing noise amplification, and wherein S is a positive definite or positive semi-definite matrix, and determine the regularization parameter k and recover the speed and/or acceleration vector $\beta$ from the position data or displacement data y by using the following equation: $\beta=(A^T WA+\kappa S)^{-1} A^T Wy$;
   wherein the controller is configured to generate a speed or acceleration signal based on the speed or acceleration vector $\beta$ and cause the speed or acceleration signal to be output form the device.

8. The device of claim 7, wherein the recovery module is configured to determine the regularization parameter k using the minimum mean squared error method.

9. The device of claim 7, wherein the recovery module is configured to use one of: the generalized cross validation (GCV) method, the L curve method with the 2-norm of the residual errors and parameters, the truncated singular value decomposition method by discarding some smallest eigenvalues, Akaike Bayesian information criterion (ABIC), or the L1L2 norm minimization method.

10. The device of claim 7, wherein the device is structured to be a component of any of: an accelerometer, a seismograph, a vibration and shock detection sensor, an inertial measurement unit, a gravimeter, an AED, an airbag deployment system, a stepping board, or a free-fall sensor.

11. The device of claim 7, wherein the physical sensing device is configured to generate a detectable signal in response to a force acting on the physical sensing device, and wherein the position data or displacement data for the moving body is derived from the detectable signal.

12. The device of claim 11, wherein the physical sensing device is one of a piezoelectric sensing device, a piezoresistive sensing device, or a capacitive sensing device.

13. A device for measuring speed and/or acceleration of a moving body based on a regularization algorithm, the device comprising:
an output device configured to output position data or displacement data for the moving body, the output device being a physical sensing device of an accelerometer or a global navigation satellite system (GNSS) device; and
a controller including:
an acquisition module configured to acquire the position data or displacement data; and
a regularization module configured to express the position data or displacement data as an integral equation of speed or acceleration and to use a regularization method to calculate speed and/or acceleration by using the position data or displacement data,
wherein the regularization module comprises:
a discretization module configured to discretize the integral equation of speed or acceleration in order to obtain the matrix form of a linear discrete observation equation, wherein the matrix form is expressed as $y=A\beta+\varepsilon$, wherein y is a vector of the position data or displacement data, wherein A is a discrete coefficient matrix, wherein $\beta$ is a speed or acceleration vector, and wherein $\varepsilon$ is a random error vector of the position data or displacement data; and
a recovery module configured to recover the speed or acceleration vector $\beta$ from the position or displacement data y by using the regularization method, wherein the recovery module is further configured to build an optimization objective function, wherein the objective function is expressed as min: $F(\beta)=(y-A\beta)^T W(y-A\beta)+\kappa \beta^T S\beta$, wherein W is a weight matrix of the position data or displacement data, wherein $\kappa$ is a regularization parameter for suppressing noise amplification, and wherein S is a positive definite or positive semi-definite matrix, and determine the regularization parameter $\kappa$ and recover the speed and/or acceleration vector $\beta$ from the position data or displacement data y by using the following equation: $\beta=(A^T W A+\kappa S)^{-1} A^T W y$
wherein the controller is configured to generate a speed or acceleration signal based on the speed or acceleration vector $\beta$ and cause the speed or acceleration signal to be output form the device.

14. The device of claim 13, wherein the device is structured to be a component of any of: an accelerometer, a seismograph, a vibration and shock detection sensor, an inertial measurement unit, a gravimeter, an AED, an airbag deployment system, a stepping board, or a free-fall sensor.

15. The device of claim 13, wherein the recovery module is configured to determine the regularization parameter k using the minimum mean squared error method.

16. The device of claim 13, wherein the recovery module is configured to use one of: the generalized cross validation (GCV) method, the L curve method with the 2-norm of the residual errors and parameters, the truncated singular value decomposition method by discarding some smallest eigenvalues, Akaike Bayesian information criterion (ABIC), or the L1L2 norm minimization method.

17. The device of claim 13, wherein the physical sensing device is configured to generate a detectable signal in response to a force acting on the physical sensing device, and wherein the position data or displacement data for the moving body is derived from the detectable signal.

18. The device of claim 17, wherein the physical sensing device is one of a piezoelectric sensing device, a piezoresistive sensing device, or a capacitive sensing device.

* * * * *